United States Patent [19]

Hawkins

[11] 3,913,421

[45] Oct. 21, 1975

[54] METHOD FOR INSTALLING A CAPILLARY INSERT IN A PASSAGE THROUGH A SPINNERET

[75] Inventor: Curtis Owen Hawkins, Cove City, N.C.

[73] Assignee: E. I. Du Pont de Nemours & Company, Wilmington, Del.

[22] Filed: June 5, 1974

[21] Appl. No.: 476,545

[52] U.S. Cl. .............. 76/107 S; 29/470.5; 29/523; 425/464
[51] Int. Cl.² ..................................... B21K 5/20
[58] Field of Search .......... 29/470.5, 506, 507, 516, 29/520, 523, 251, 282; 76/107 S; 425/461, 464

[56] References Cited
UNITED STATES PATENTS

| | | | |
|---|---|---|---|
| 2,839,783 | 6/1958 | DeWolf | 425/464 |
| 3,006,026 | 10/1961 | Martin | 425/464 |
| 3,137,066 | 6/1964 | Merino | 29/470.5 |
| 3,439,381 | 4/1969 | Plomp | 425/464 |

*Primary Examiner*—Al Lawrence Smith
*Assistant Examiner*—J. C. Peters

[57] ABSTRACT

A method for installing an insert in a spinneret plate involves positioning a preformed capillary insert in a passage in the plate with the exit face of the capillary insert and the exit face of the spinneret in perfect alignment. By distortion and/or welding the insert, in the vicinity of its entrance face, it is sealed to the plate and held in place.

3 Claims, 7 Drawing Figures

METHOD FOR INSTALLING A CAPILLARY INSERT IN A PASSAGE THROUGH A SPINNERET

BACKGROUND OF THE INVENTION

This invention relates to spinnerets and more particularly to the manufacture or repair of spinnerets in which inserts having preformed spinning orifices are mounted in passages of a spinneret plate.

While there is considerable prior art relative to spinnerets having capillary inserts, none is known which does not require the insert and the spinneret passage to have at least two diameters and a joining ledge for vertical positioning the insert within the passage while pressing insert into place to assure precise alignment of the spinneret and insert exit faces as required for wiping the spinneret face during use. Machining the spinneret passage and insert in this fashion is very costly. This invention overcomes the drawbacks of the prior art and provides an inexpensive route to improved spinneret repair and manufacture.

SUMMARY OF THE INVENTION

A method for installing an insert in a passage connecting upper and lower surfaces of a spinneret plate, said passage having a single cylindrical length with an enlargement adjacent said upper surface, said method comprising: positioning the lower surface of said plate against a flat supporting surface; placing an insert having a single outside diameter and a bore therethrough in said passage, said outside diameter being slightly less than the diameter of the passage to provide a sliding fit there between; sliding said insert against said flat supporting surface, said insert having one end extending into said enlargement; and sealing the outside periphery of said one end of said insert to said enlargement.

DETAILED DESCRIPTION OF THE ILLUSTRATED EMBODIMENTS

Figure 1:
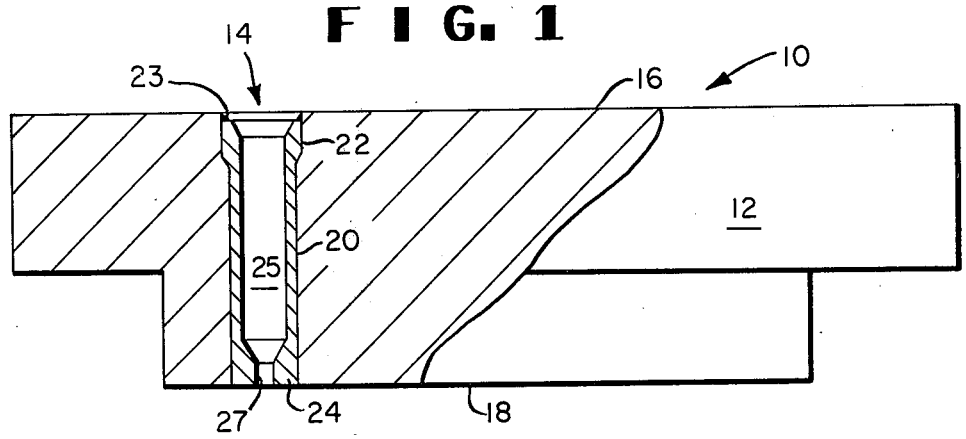
FIG. 1 is a view partially in section of a spinneret according to the invention.

Referring now to the drawing, spinneret 10 is adapted to be mounted in a conventional spinning pack for supplying a polymer composition to be spun into a filament. The spinneret 10 is formed from a plate 12 and is provided with a passage 14 connecting its upper and lower surfaces 16, 18, respectively. The passage has a cylindrical length 20 with an enlargement 22 adjacent the upper surface 16 of plate 12. An insert 24 is swaged into enlargement 22 of passage 14. The insert 24 is provided with a comparatively large central axial bore 25 leading to a capillary 27 at its exit end. The insert 24 as seen in FIG. 2 prior to placing in the spinneret passage has only one outside diameter $d$ which is somewhat smaller than the diameter D of passage length 20, because of this the insert has a sliding fit with the cylindrical length 20 of passage 14.

Figure 2:
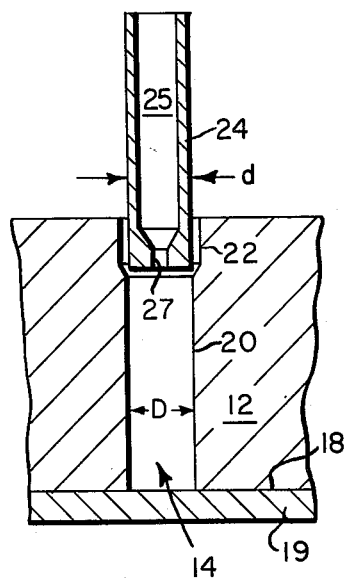
FIGS. 2–4 illustrate the method of mounting the inserts of FIG. 1.
Figure 3:
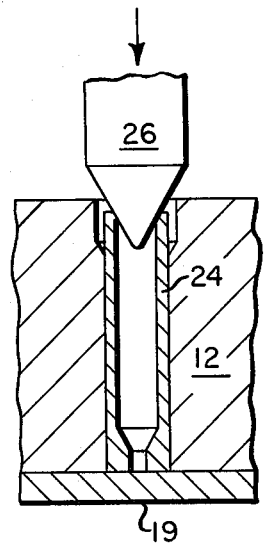
Figure 4:
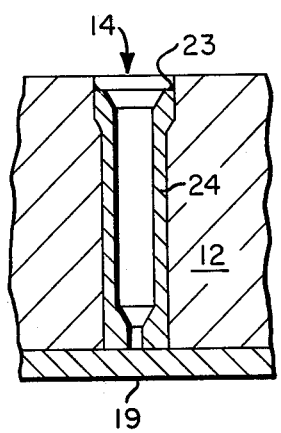
Figure 5:
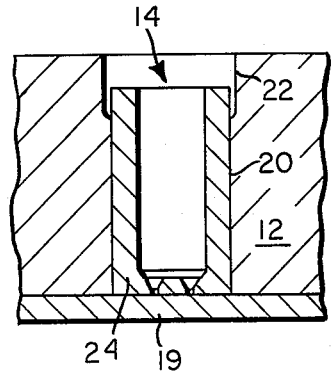
FIGS. 5–7 illustrate an alternate method of mounting an insert in a spinneret plate passage.
Figure 6:
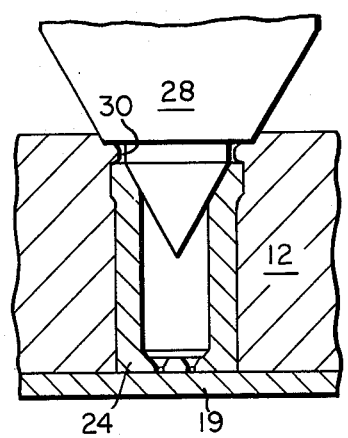
Figure 7:
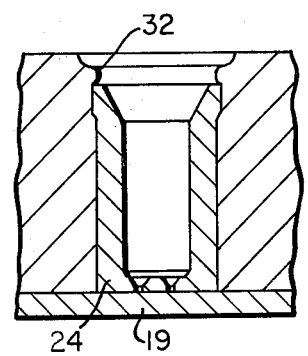

One method for installing the inserts in the spinneret is illustrated in FIGS. 2–4 and an alternate method is shown in FIGS. 5–7. In both instances, the lower surface 18 of plate 12 is positioned against a flat supporting surface 19. Next, the insert 24 is placed into passage 14 against surface 19. For swaging the inserts into place, special punches 26 (FIG. 3) and 28 (FIG. 6) are provided. The punches have generally tapered ends which engage the inner periphery of a central bore through the insert. FIG. 3 shows the punch 26 being forced down pushing the insert 24 against the surface 19 and expanding the top of the insert into enlargement 22. FIG. 4 shows the insert deformed into the enlargement. The punch shown in FIG. 6 includes a shoulder 30 which when the die is pressed into the insert will engage the upper surface 16 of plate 12 and deform the metal into a lip 32 over the top of the insert locking it into place. In the methods illustrated in FIGS. 2–4, the locking and sealing of the outside periphery of the insert 24 into the enlargement 22 is accomplished by deforming the upper portion of the insert into the passage 14, then welding the outer periphery of the insert to the inner wall of passage 14 as illustrated at 23 in FIGS. 1 and 4.

The spinneret of this invention has the advantage of limiting the distortion or welding of the insert to the vicinity of the upper surface 16 of plate 12. In this manner, insert 24 is easily removable and replaceable at a later time by merely machining out the welded or deformed portion. The remainder of the insert slides out easily.

What is claimed is:

1. A method for installing an insert in a passage connecting upper and lower surfaces of a spinneret plate, said passage having a single cylindrical length with an enlargement adjacent said upper surface, said method comprising: positioning the lower surface of said plate against a flat exterior supporting surface; placing an insert having a single outside diameter and a bore therethrough in said passage, said outside diameter being slightly less than the diameter of the passage to provide a sliding fit there between; sliding said insert against said flat supporting surface for vertical positioning in said passage, said insert having one end extending into said enlargement the other end being flush with the lower surface of said plate; and sealing the outside periphery of said one end of said insert to said enlargement.

2. The method of claim 1, said sealing step comprising swaging said one end of said insert into said enlargement and forming a lip from said plate, said lip engaging said one end of said insert.

3. The method of claim 1, said sealing step comprising swaging said one end of said insert to said enlargement and then welding said one end of said insert to said enlargement.

* * * * *